3,116,261
THERMOELECTRIC COMPOSITION OF MATTER CONTAINING SILVER, TITANIUM, AND A CHALKOGEN

Lothar H. Brixner, West Chester, Pa., assignor to E. I. du Pont de Nemours and Company, Wilmington, Del., a corporation of Delaware
No Drawing. Filed Jan. 3, 1961, Ser. No. 80,005
5 Claims. (Cl. 252—514)

This invention relates to new thermoelectric materials.

It is an object of the present invention to produce thermoelectric materials which are useful in devices where a Seebeck voltage (thermocurrent) is required. Such materials are substantially homogeneous crystalline products containing silver, titanium, and a chalkogen from the group consisting of tellurium and selenium. When the chalkogen is tellurium, the atom ratio of silver, titanium, and tellurium is 1:1:3, and when the chalkogen is selenium, the atom ratio is 1:1:2.

The products of this invention can be prepared by firing under inert conditions a powdered mixture of silver, titanium, and the chalkogen in the atom ratios indicated. The duration of the firing period will vary, depending upon the reactants used, the size of the charge, and the equipment used in firing. The firing procedure used to produce the products of this invention is conventional, and one skilled in the art can readily determine optimum firing time for any set of conditions. Firing causes an increase in the volume of the charge, and the product obtained is a crystalline material which can be pressed into a compact mass of desired shape for use in thermoelectric applications. It is preferred to use as starting materials commercially available reactants of highest purity and to have them in a —200 mesh (standard screen scale) particle size before firing.

In a preferred method of preparation, the products of this invention are formed by grinding together silver, titanium, and either tellurium or selenium. If tellurium is used in the grinding mixture, the atom ratio of silver to titanium to tellurium should be 1:1:3. On the other hand, if selenium is used, the atom ratio of the respective elements should be 1:1:2. The mixture attained from the grinding operation is compacted into pellets and fired under inert conditions at temperatures in the range of 700° C. to 1100° C. for a period of 1 to 16 hours. The product of this first firing can be pressed into a desired shape for use in thermoelectric applications. However, it is more desirable to regrind the product of the first firing, repress it into a desired shape, and refire to sinter the material into a strong, coherent end product of conventional shape for the application for which it is to be used.

For a clearer understanding, the following specific examples are given. These examples are intended to be merely illustrative of the invention and not in limitation thereof. Unless otherwise specified, all parts are by weight.

EXAMPLE I

A thermoelectric material comprising silver, titanium, and selenium was prepared by the following procedure: A homogeneous mixture comprising 4.000 parts silver, 1.776 parts titanium, and 5.8556 parts selenium was prepared by thoroughly blending the component (—200 mesh U.S. Standard Sieve Size) powders. This powder mix was then sealed under vacuum in a quartz ampoule measuring 15 mm. x 20 cm. The ampoule was slowly heated to 900° C. and this temperature maintained for a period of 12 hours. A crystalline reaction product resulted. This product was reground and pressed into a bar ¼" x ¼" x 2" and the bar was refired in vacuum for a period of 14 hours at 800° C.

The product obtained was found to be thermally stable to a temperature of at least 700° C. The resistivity of the bar was measured by the four-point method and was found to be 0.45 milliohm-cm. Electrical energy was developed by butting the bar between two copper blocks (machined from the same piece of stock) maintained at different temperatures. The temperatures were measured at approximately the cross-sectional center of the bar immediately behind the contact faces. With a temperature differential ($\Delta T$) of 13° C. ($T_1=29°$ C., $T_2=42°$ C.), an E.M.F. of 1.39 millivolts was obtained. The Seebeck coefficient $$\left(\frac{E.M.F.}{\Delta T} \times 1000\right)$$

was calculated from this data. This value and other electrical properties are given in the table which follows the examples.

EXAMPLE II

Using the same procedure as described in Example I, 3.000 parts of silver, 1.332 parts titanium, and 10.6461 parts tellurium, each of —200 mesh particle size, were thoroughly blended and sealed in an evacuated quartz ampoule. The ampoule was heated to 900° C., and this temperature was maintained for 12 hours. The ampoule was then furnace-cooled, the crystalline product removed from the ampoule and reground. The powder was pressed into a bar ¼" x ¼" x 2" and the bar refired in vacuum for a period of 12 hours at 800° C. The bar was tested for electrical properties, and these are summarized in the table below. The product was found to be thermally stable to at least 700° C.

The following table gives electrical data on the materials of Examples I and II. It has not been clearly established whether these new products are true compounds, altho X-ray diffraction data indicates the presence of new lines. The last column entitled "Figure of Merit in ° C.⁻¹" is a calculated figure which those skilled in the art use to evaluate thermoelectric materials. This figure takes into account the fact that low resistivity and low thermal conductivity as well as high Seebeck coefficient are necessary for a good thermoelectric material. The equation for calculating the "figure of merit" is as follows:

$$Z \text{ (figure of merit in ° C.}^{-1}) = \frac{S^2}{rk}$$

where $r$ is the resistivity in ohm-cm., $k$ is the thermal conductivity in watts per cm.-degree, and $S$ is the Seebeck coefficient in volts per degree.

Table

| Example No. | Elements present in composition | Atom ratio of elements in composition | Temp. at cold face ($T_1$), ° C. | Temp. at hot face ($T_2$), ° C. | Seebeck coefficient in microvolts per ° C. (S) | Resistivity in milliohm-cm. (r) | Thermal conductivity, watts/deg. cm. | Figure of merit in ° C.⁻¹ |
|---|---|---|---|---|---|---|---|---|
| I | Ag, Ti, Se | 1:1:2 | 29 | 42 | 107 | 0.45 | 0.015 | $1.66 \times 10^{-3}$ |
| II | Ag, Ti, Te | 1:1:3 | 31 | 197 | 100 | 0.94 | 0.018 | $0.59 \times 10^{-3}$ |

From the thermoelectric properties given for the materials of this invention, it will be evident that these materials are useful in thermoelectric generators. The measured properties also make it evident that these new compositions could be used for thermoelectric cooling by the Peltier effect.

Since it is obvious that many changes and modifications can be made in the above-described details without departing from the nature and spirit of the invention, it is to be understood that the invention is not limited to said details except as set forth in the appended claims.

The embodiments of the invention in which an exclusive property or privilege is claimed are defined as follows:

1. A process for the production of a thermoelectric composition of matter comprising firing in a closed system, at a temperature of from 700° C. to 1100° C. for a period of from 1 to 16 hours, a powdered mixture of silver, titanium, and a chalkogen from the group consisting of tellurium and selenium, in an atom ratio of 1:1:3 when the chalkogen is tellurium, and in an atom ratio of 1:1:2 when the chalkogen is selenium.

2. A process for the production of a thermoelectric composition of matter comprising firing in a closed system, at a temperature of from 700° C. to 1100° C. for a period of from 1 to 16 hours, a powdered mixture of silver, titanium, and a chalkogen from the group consisting of tellurium and selenium in an atom ratio of 1:1:3 when the chalkogen is tellurium, and in an atom ratio of 1:1:2 when the chalkogen is selenium, and then recompacting and refiring the product of the first firing.

3. A substantially homogeneous crystalline composition of matter having thermoelectric properties comprising silver, titanium, and a chalkogen from the group consisting of tellurium and selenium in an atom ratio of 1:1:3 when the chalkogen is tellurium, and in an atom ratio of 1:1:2 when the chalkogen is selenium.

4. A substantially homogeneous crystalline composition of matter having thermoelectric properties comprising silver, titanium, and tellurium in an atom ratio of 1:1:3.

5. A substantially homogeneous crystalline composition of matter having thermoelectric properties comprising silver, titanium, and selenium in an atom ratio of 1:1:2.

References Cited in the file of this patent

UNITED STATES PATENTS

| | | |
|---|---|---|
| 2,882,467 | Wernick | Apr. 14, 1959 |
| 2,882,468 | Wernick | Apr. 14, 1959 |
| 2,882,471 | Wernick | Apr. 14, 1959 |